Patented Apr. 2, 1940

2,195,536

UNITED STATES PATENT OFFICE 2,195,536

LIGHT-COLORED ASPHALT

Kenneth C. Laughlin and Harry E. Cier, Baton Rouge, La., assignors to Standard Oil Development Company, a corporation of Delaware No Drawing. Application December 31, 1935
Serial No. 56,911

6 Claims. (Cl. 196—22)

Asphalt has been limited in its field of application as a plastic, binder and thickener by reason of the fact that because of its dark color it could not be employed in colored, particularly light-colored, products. It is the object of the present invention to provide a light-colored asphalt which can be incorporated in substantial amounts in light-colored compositions without appreciably altering the color thereof and can itself be colored by admixture therewith of suitable pigments.

The color of asphalt is measured in absolute color units. 1,000 absolute color corresponds to a Robinson color of 2.8 or the color of a .1% solution of $K_2Cr_2O_7$. Absolute color is determined by the dilution of the substance to be tested, in this case asphalt, to a point where the color can be measured on the Robinson or Saybolt scale. The Robinson or Saybolt color of this solution is then converted into the corresponding absolute color which is multiplied by the degree of dilution of the solution of the substance being tested to give the absolute color of that substance.

Asphalt normally has an absolute color of at least 900,000 and usually in the neighborhood of 1,200,000. This is the type of asphalt that is precipitated from crude petroleum hydrocarbons or distillation residues thereof by liquid propane at a temperature ranging from 80° to 150° F.

We have found that if in the deasphaltizing of petroleum oils and residua thereof after the first precipitation step at 80°–150° F., the temperature of the extract is raised from 20° to 130° F., a second precipitate is obtained. This precipitate will be hereinafter referred to as the resin cut or "colorless" asphalt and is the light-colored asphalt in which the present invention resides. This resin cut usually has, after a light sulfuric acid treat, an absolute color below 600,000 and as low as 100,000. In general it may be said that the higher the temperature of the asphalt precipitation step the lower will be the color of the resin cut. It is to be noted also that the resin cut can be given an increasingly lower color by making the acid treat heavier.

It is also possible to obtain the resin cut by precipitating the asphalt at a temperature of about 200–250° F., separating the extract from the precipitate and extracting the precipitate with propane, butane or a mixture of ethane and propane or of propane and butane or of all three at a lower temperature depending on the nature of the precipitant. In the case of propane, this temperature would be between 80° and 150° F. depending on the degree of freedom of color desired in the resin cut. The initial separation of the oil from the mixed resin cut and dark asphalt may be effected by distillation as well as by solvent extraction. In any case in order to obtain the desired absence of color in the resin cut it is essential that the resin be acid treated while in solution in the light hydrocarbon at substantially the same temperature employed for the asphalt precipitation.

Another method of obtaining the colorless asphalt according to the present invention is to precipitate dark asphalt from a residuum by butane at a temperature ranging from 120°–250° F., acid treat the butane solution of oils and resin cut with concentrated $H_2SO_4$, such as 98% $H_2SO_4$ at substantially the same temperature employed for the asphalt precipitation, with an amount of acid ranging from 5 lbs. per barrel to 30 lbs./bbl., and precipitate the resin cut by the addition of propane or other light hydrocarbons or mixture of light hydrocarbons at a suitable temperature, ranging from about 100° F.–230° F. in the case of propane.

The light-colored, or "colorless," asphalt prepared according to the present invention has a penetration value between 10 and 200 decimillimeters depending upon the degree to which dark asphalt is removed in the initial precipitation step. It has a softening point between 90° F. and 150° F., the softening point being higher, in general, the lower the temperature at which the resin cut is isolated.

The light-colored, or "colorless," asphalt of the present invention is adapted for a wide variety of uses such as in linoleum, colored tiles, as a binder or plastic in the manufacture of colored ornaments, tableware, etc., from artificial plastics and in general in any capacity in which color plastics have previously been employed.

Our invention may be more clearly understood from the following description of illustrative specific embodiments thereof.

Example 1

The bottoms from reduced Lago crude was extracted with butane at a temperature of about 120° F. The extract was removed and treated with 10 lbs./bbl. of 98% $H_2SO_4$, the butane oil ratio being 4 to 1. This acid treated extract was mixed with propane at the same temperature, the propane oil ratio being 7 to 1. A yield of "colorless" asphalt, amounting to 47.5% by weight of the butane extract and having a softening point of 91° F. and an absolute color of 570,000 was obtained. A similar yield of colorless asphalt would be obtained by heating the butane solution after acid treatment to a temperature between 210° and 250° F. and separating the two layers.

*Example 2*

One part of a residuum from Quire-Quire crude was mixed with four parts of butane at a temperature of 130° F. 14%, based on the crude, of hard dark asphalt was precipitated. The butane extract was treated with 10#/bbl. of 98% H₂SO₄. The acid treated extract was mixed with propane in an amount constituting 7 parts to each part of oil at 120° F. A yield of "colorless" asphalt having a softening point of 115° F. and an absolute color of 280,000 was obtained in an amount constituting 32.5% of the crude residual.

Various modifications may obviously be made in the methods described above without departing from the scope of this invention which is not to be limited by any examples or explanations presented herein, all of which are presented solely for purpose of illustration. This invention is to be limited only by the following claims, in which it is desired to claim all novelty insofar as the prior art permits.

We claim:

1. The method for the manufacture of a light-colored asphalt from an asphaltic oil which comprises adding to a residuum of an asphaltic crude oil liquid propane, raising the temperature to about 80°–150° F., separating a precipitate which is thereby formed, treating the remaining solution with sulfuric acid, separating the sulfuric acid and raising the temperature 20° to 130° F. whereby a second precipitate of a light colored asphalt is obtained, and separating the light colored asphalt.

2. The method for the manufacture of a light-colored asphalt from an asphaltic oil which comprises precipitating hard asphalt from said oil by mixing said oil with a hydrocarbon solvent containing not more than four carbon atoms at a temperature of about 80° to 150° F., separating the solution of oil and light hydrocarbon from said asphalt, subjecting said solution to treatment with concentrated sulfuric acid at a temperature of about 80° to 150° F., and increasing the temperature of the acid treated solution after it has been separated from the sludge acid 20 to 130° F., thereby causing a light-colored asphalt to precipitate therefrom.

3. A process for the manufacture of light-colored asphalt from an asphaltic oil which comprises treating an asphaltic oil with a hydrocarbon solvent containing not more than four carbon atoms at a temperature of about 200 to 250° F., separating the solution of oil and light hydrocarbon from an asphalt that was thereby precipitated, treating the said precipitate with a hydrocarbon solvent containing not more than four carbon atoms at a temperature of about 80° to 150° F. to dissolve part of the precipitated asphalt, subjecting said solution to treatment with concentrated sulfuric acid at a temperature of about 80° to 150° F. and increasing the temperature of the acid treated solution 20° to 130° F. thereby causing a light-colored asphalt to precipitate therefrom.

4. The method for the manufacture of a light-colored asphalt from an asphaltic oil which comprises treating the residuum of an asphaltic crude oil with butane at a temperature of about 120 F., the butane oil ratio being 4:1, separating a precipitate which was thereby formed, acid treating the solution with 10 lbs./bbl. of sulfuric acid of a concentration of 98% while the solution is maintained at a temperature of 120° F., treating the acid treated extract with propane at 120° F., the propane oil ratio being 7:1, thereby precipitating a light colored asphalt therefrom.

5. A method for the manufacture of a light-colored asphalt from asphaltic oil which comprises adding to the residuum of an asphaltic crude oil four parts of butane for each part of the oil at a temperature of 130° F., separating a precipitate which is thereby formed, treating the butane extract with 10 lbs./bbl. of sulfuric acid of a concentration of 98%, adding to the acid treated extract seven parts of propane to each part of the extract at 120° F. and thereby precipitating a light colored asphalt therefrom.

6. The method for the manufacture of a light-colored asphalt from an asphaltic oil which comprises precipitating hard asphalt from said oil by mixing said oil with a hydrocarbon solvent containing not more than 4 carbon atoms at a temperature of about 80° to 150° F., separating the solution of oil and light hydrocarbon from said asphalt, subjecting said solution to treatment with concentrated sulfuric acid at a temperature of about 80° to 150° F., and decreasing the specific gravity of the acid treated solution after it has been separated from the acid sludge, thereby causing a light-colored asphalt to precipitate therefrom.

KENNETH C. LAUGHLIN.
HARRY E. CIER.